(12) United States Patent
Forman

(10) Patent No.: US 7,182,866 B2
(45) Date of Patent: Feb. 27, 2007

(54) APPARATUS AND METHOD FOR SEPARATING IMPURITIES FROM A STREAM

(76) Inventor: Dirk Blaine Forman, 125 S. St. Louis, Lafayette, LA (US) 70506

( * ) Notice: Subject to any disclaimer, the term of this patent is extended or adjusted under 35 U.S.C. 154(b) by 394 days.

(21) Appl. No.: 10/814,023

(22) Filed: Mar. 31, 2004

(65) Prior Publication Data

US 2005/0218062 A1   Oct. 6, 2005

(51) Int. Cl.
*B01D 63/16*   (2006.01)
*B01D 63/10*   (2006.01)
*B01D 63/00*   (2006.01)

(52) U.S. Cl. .................... 210/321.68; 210/321.76; 210/650; 210/652; 210/780; 210/787; 210/360.1; 210/321.83; 210/321.85; 210/321.88

(58) Field of Classification Search ............ 210/321.68
See application file for complete search history.

(56) References Cited

U.S. PATENT DOCUMENTS

| | | | |
|---|---|---|---|
| 3,669,879 A | 6/1972 | Berriman | |
| 3,840,121 A | 10/1974 | Baram | |
| 3,879,286 A | 4/1975 | Berriman | |
| 3,880,592 A | * 4/1975 | Kelley et al. ........... | 436/45 |
| 4,230,564 A | 10/1980 | Keefer | |
| 4,261,833 A | 4/1981 | Pohl et al. | |
| 4,333,832 A | 6/1982 | Siwecki et al. | |
| 4,482,459 A | 11/1984 | Shiver | |
| 4,592,768 A | 6/1986 | Cutler et al. | |
| 4,886,597 A | 12/1989 | Wild et al. | |
| 6,132,613 A | 10/2000 | Hopkin et al. | |
| 6,187,197 B1 | 2/2001 | Haddock | |
| 6,220,951 B1 | 4/2001 | Clayton et al. | |
| 6,245,121 B1 | 6/2001 | Lamy et al. | |
| 6,270,823 B1 | 8/2001 | Jolkin | |
| 6,358,407 B1 | 3/2002 | Liao et al. | |
| 6,375,849 B1 | 4/2002 | Crabtree et al. | |
| 6,416,668 B1 | 7/2002 | Al-Samadi | |
| 6,620,327 B2 | 9/2003 | Haddock | |
| 2002/0017491 A1 | 2/2002 | Haddock | |
| 2002/0070165 A1 | 6/2002 | Schmidt | |
| 2003/0054546 A1 | 3/2003 | Petrecca et al. | |
| 2003/0064428 A1 | 4/2003 | Herman et al. | |
| 2003/0127391 A1 | 7/2003 | Craft, Sr. et al. | |

* cited by examiner

*Primary Examiner*—Krishnan S. Menon
(74) *Attorney, Agent, or Firm*—C. Dean Domingue; Robert L. Waddell; Ted. M. Anthony

(57) ABSTRACT

A filtration apparatus and method for filtering a stream. The apparatus comprises a rotor that contains an inlet for the stream and an array of cavities operatively arranged to receive the stream from the impeller. The rotor member further includes membranes, operatively positioned within the array of cavities, for separating the impurities from the stream, and a permeate outlet for delivering a permeate from the rotor. A drive member is included for rotating the rotor so that the stream is exposed to a centrifugal force. In one preferred embodiment, the rotor contains a baffle plate to distribute the stream about the inner portion and an impeller vane adapted to receive the stream.

20 Claims, 5 Drawing Sheets

APPARATUS AND METHOD FOR SEPARATING IMPURITIES FROM A STREAM

BACKGROUND OF THE INVENTION

This invention relates to an apparatus for separating impurities from a stream. More particularly, but not by way of limitation, this invention relates to an apparatus and method for separating impurities from a stream utilizing centrifugal forces.

Reverse osmosis (RO) is a filtration process for the removal of ionic and organic pollutants from wastewater. Prior art techniques utilize a filtration process by which large arrays of high pressure piping and pressure pumps direct the affluent to filters. This process yields low volumes of filtrated output (permeate), utilizes large areas for pipe array ad components and concentration polarization and membrane fouling hinders the wide application of RO filtration process.

Prior art RO, ultra filtration, and nano filtration utilizes a static pressure flow across membranes to induce filtration. This process uses pressure vessel piping which causes a build up of sedimentation against these membranes which hinders the function of the cross flow membranes which results in a decrease in filtrate flux. This concentration polarization and membrane fouling limits the volume of permeate production which leads to not utilizing the standard RO process as a viable alternative to disposal.

Therefore, there is a need for an apparatus and method that will remove ionic and organic pollutants from a stream. There is also a need for an apparatus and method that will provide for an efficient reverse osmosis process. These and many other needs will be met by the invention herein disclosed.

SUMMARY OF THE INVENTION

A filtration apparatus for filtering a stream is disclosed. The apparatus comprises a rotor member having an inner portion and an outer portion. The rotor member comprises an inlet for the stream; an array of cavities operatively arranged to receive the stream from the impeller, with the array of cavities being arranged at a angle of between 45 degrees and 10 degrees relative to a horizontal axis of the rotor member. The rotor member further includes means, operatively positioned within the array of cavities, for separating the impurities from the stream, and a permeate outlet for delivering a permeate from the rotor bowl. The apparatus may also contain drive means, operatively connected to the rotor member, for rotating the rotor member so that the stream is exposed to a centrifugal force.

In one preferred embodiment, the rotor member contains a baffle plate to distribute the stream about the inner portion. The rotor member may also contain an impeller vane arranged on the inner portion of the rotor bowl and wherein the impeller vane is adapted to receive the stream.

The separating means may comprise a spiral wound membrane cartridge adapted to fit within the cavities. In one preferred embodiment, the rotor bowl contains a retentate outlet for delivering the retentate from the rotor bowl. The retentate outlet of the rotor member may contain a back pressure valve for regulating the pressure within the retentate outlet and keeping the retentate flowing in a radially inward direction. In the most preferred embodiment, the permeate outlet is directed to the outer portion of the rotor bowl so that the permeate is directed radially outward. Also in the most preferred embodiment, the retentate outlet is directed to an inner chamber located radially inward from the array of cavities so that the retentate is directed radially inward. In the preferred embodiment, the filter array is orientated at a angle between 60 degrees and 10 degrees relative to the horizontal axis of the rotor member, and in the most preferred embodiment, the filter array is orientated at an angle of approximately 45 degrees relative to the horizontal axis of the rotor member.

A method of separating an affluent is also disclosed. The method comprises providing a rotor apparatus, and wherein the rotor apparatus comprises a rotor member including an inlet for the stream; an array of cavities operatively arranged on the outer periphery of the rotor apparatus and adapted to receive the affluent; a membrane, positioned within the array of cavities, for separating the impurities from the stream and, a permeate outlet for delivering a permeate from the rotor bowl. The method further includes flowing the affluent to the inlet of the rotor apparatus and rotating the rotor apparatus. A centrifugal force is created within the inner portion of the rotor apparatus so that the affluent is forced to the outer periphery of the rotor apparatus.

The method further includes directing the affluent to the array of membranes arranged on the outer periphery of the rotor apparatus and separating the affluent in the membrane into a permeate stream and a retenate stream. Next, the permeate is produced from the rotor apparatus and the retentate stream is also produced from the rotor apparatus. In one preferred embodiment, the step of directing the affluent to the array of membranes includes channeling the affluent about a baffle arranged within the inner portion of the rotor apparatus. Also, the step of directing the affluent to the array of membranes includes channeling the affluent to a plurality of impeller vanes arranged on the inner portion of the rotor apparatus.

In one preferred embodiment, the permeate outlet is directed to the outer portion of the rotor bowl and wherein the step of producing the permeate includes directing the permeate radially outward. The method may also include the step of producing the retentate stream from the rotor apparatus by directing the retentate to an inner chamber located radially inward from the array of cavities so that the retentate is directed radially inward. Additionally, the method may include controlling the back pressure within the retentate outlet when producing the retentate stream from the rotor apparatus.

An advantage of the present invention is the centrifugal force that is created mimics pressures set up in a static pressure vessel by the tangential escape vector through the apparatus. Another advantage is that the present invention can use prior art vertical centrifuges that can be retrofitted to contain the membranes. Still yet another feature is that the present invention can be used as a reverse osmosis process to remove ionic and organic pollutants from a stream.

A feature of the present invention is that the created centrifugal forces also set up vortices which induce a spiral flow through the membrane that promotes sediment discharge enhancing the flux improving permeate volumes and membrane performance. Another feature is that the desired rotation speed of the centrifuge is determined by the desired filter pressure and type of filtration to be utilized. Another feature is a rotor bowl that holds the filter array that utilizes the force of the tangential escape vector velocity for particle separation. Another feature is that the filter array can be arranged about the periphery of the rotor bowl at an angle varying between 20 degrees to 50 degrees relative to the horizontal axis of the rotor bowl.

BRIEF DESCRIPTION OF THE PREFERRED EMBODIMENTS

DETAILED DESCRIPTION OF THE PREFERRED EMBODIMENTS

Figure 1:
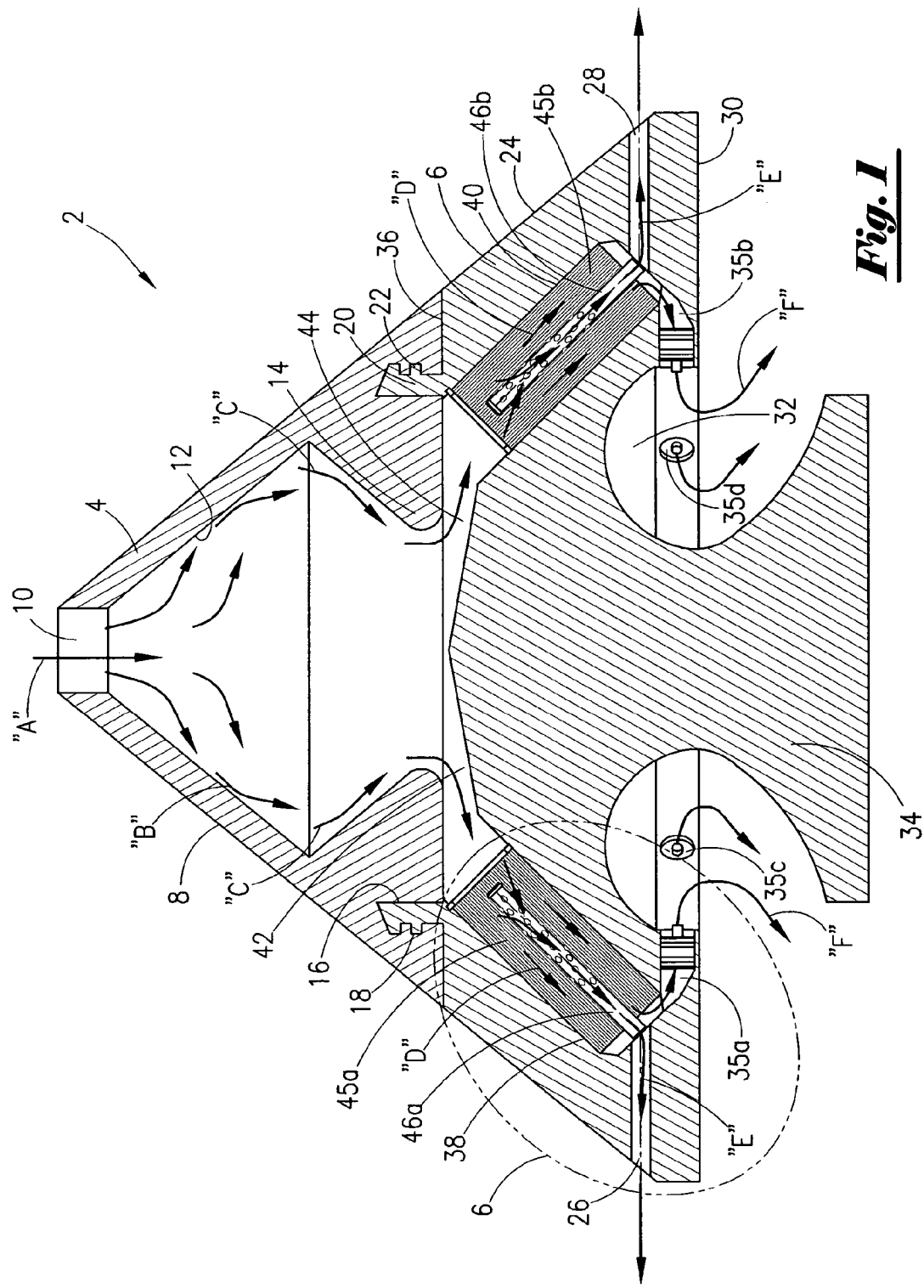
FIG. 1 is a partial cross-sectional view of the rotor member of the present invention.

Referring now to FIG. 1, a partial cross-sectional view of the rotor member 2 of the present invention will now be described. More specifically, the rotor member 2 comprises a rotor cone 4 that is operatively connected to a rotor bowl 6. The rotor cone 4 has an outer conically shaped wall 8. At the apex of the outer wall 8 is the inlet 10, and wherein the inlet 10 will allow for the entry of the stream as will be explained in greater detail later in the application. Extending radially inward, the rotor cone 4 has an inner conically shaped wall 12 that extends to the baffle 14, and wherein the baffle 14 extends about the periphery of the inner wall 12. The stream will be directed through the inlet 10 and the centrifugal force will tend to force the stream to the inner wall 12. The baffle 14 will then channel the stream radially inward, as will be described in greater detail later in the application.

The rotor cone 4 also contains a circumferential cavity, denoted by the numeral 16, and wherein the circumferential cavity 16 has contained therein internal thread means seen generally at 18. The rotor cone 4 will be threadedly connected to the rotor bowl 6. More specifically, the rotor bowl 6 contains a circumferential ridge 20 and wherein the circumferential ridge 20 has external thread means 22 that are configured to engage the internal thread means 18 so that the rotor bowl 6 is attached to the rotor cone 4. It should be noted that other means for attachment are possible such as pinning the cone 4 and bowl 6 together.

The rotor bowl 6 contains an outer conically shaped wall 24. As seen in FIG. 1, when the rotor cone 4 and the rotor bowl 6 are attached, the rotor member 2 has a conical shape. FIG. 1 shows that the outer wall 24 contains outlets 26, 28 for the permeate, as will be described later in the application. The rotor bowl 6 contains an underside 30 of the rotor bowl 6 that in turn extends to an inner circular cavity, denoted by the numeral 32, and wherein the inner circular cavity 32 extends to the base pedestal 34. The retentate channels 35a, 35b are shown and wherein the retentate channels 35a, 35b direct the retentate into the cavity 32. The retentate is the stream that has not been filtered and still contains undesirable components. The base pedestal 34 will be connected to the drive mechanism for rotating the rotor member, as will be described later in the application. FIG. 1 also shows the retentate channels 35c, 35d.

The rotor bowl 6 has a topside 36 and wherein the topside 36 contains the circumferential ridge 20. The topside 36 contains a plurality of angled bores seen generally at 38, 40. In the preferred embodiment, the angle of the bore is between 70 degrees and 10 degrees relative to horizontal, and in one preferred embodiment, the angle is between 50 degrees and 20 degrees relative to horizontal, and in the most preferred embodiment is 45 degrees relative to horizontal. The bores 38, 40 will have contained therein membrane members and wherein the membrane members will be in one preferred embodiment spiral wound membranes. FIG. 1 shows membranes 45a, 45b disposed within bores 38, 40. The membranes will be discussed in greater detail with reference to FIG. 6. Returning to FIG. 1, the topside 36 also contains a plurality of impeller vanes such as seen at 42, 44. The impeller vanes 42, 44 receive the stream from the baffle 14 and directs the stream to the bores 38, 40 for separation within the membranes.

The flow in FIG. 1 is represented by flow arrows as the rotor member 2 is being rotated. The flow arrows "A" depicts the stream entering the inlet 10. The arrows "B" represent the stream that has been forced into the inner wall 12 due to the centrifugal force. The pressurized stream will be directed radially inward "C" due to the baffle 14, and in turn, the stream is channeled into the impeller vanes 42, 44. The pressurized stream, energized by the centrifugal force created due to the rotation of the rotor member 2, will be separated within the membranes 45a, 45b as seen by arrows "D". The separated stream (referred to as the permeate) is collected from the center tubes 46a, 46b of the membranes 45a, 45b and the permeate outlets 26, 28 are aligned with the center tubes 46a, 46b in order to channel the permeate radially outward from the rotor member 2 as seen by arrows "E". The retentate is produced via the channels 35a, 35b from the membrane that has not entered the center tube (i.e. unfiltered fluid), as denoted by the arrow "F" into the circular cavity 32. Note that both the retentate and the permeate will continue to be pressurized which in turn aids in removing the retentate and permeate from the rotor member 2. A discussion of the flow through the membranes will be described with reference to FIG. 6.

Figure 2:
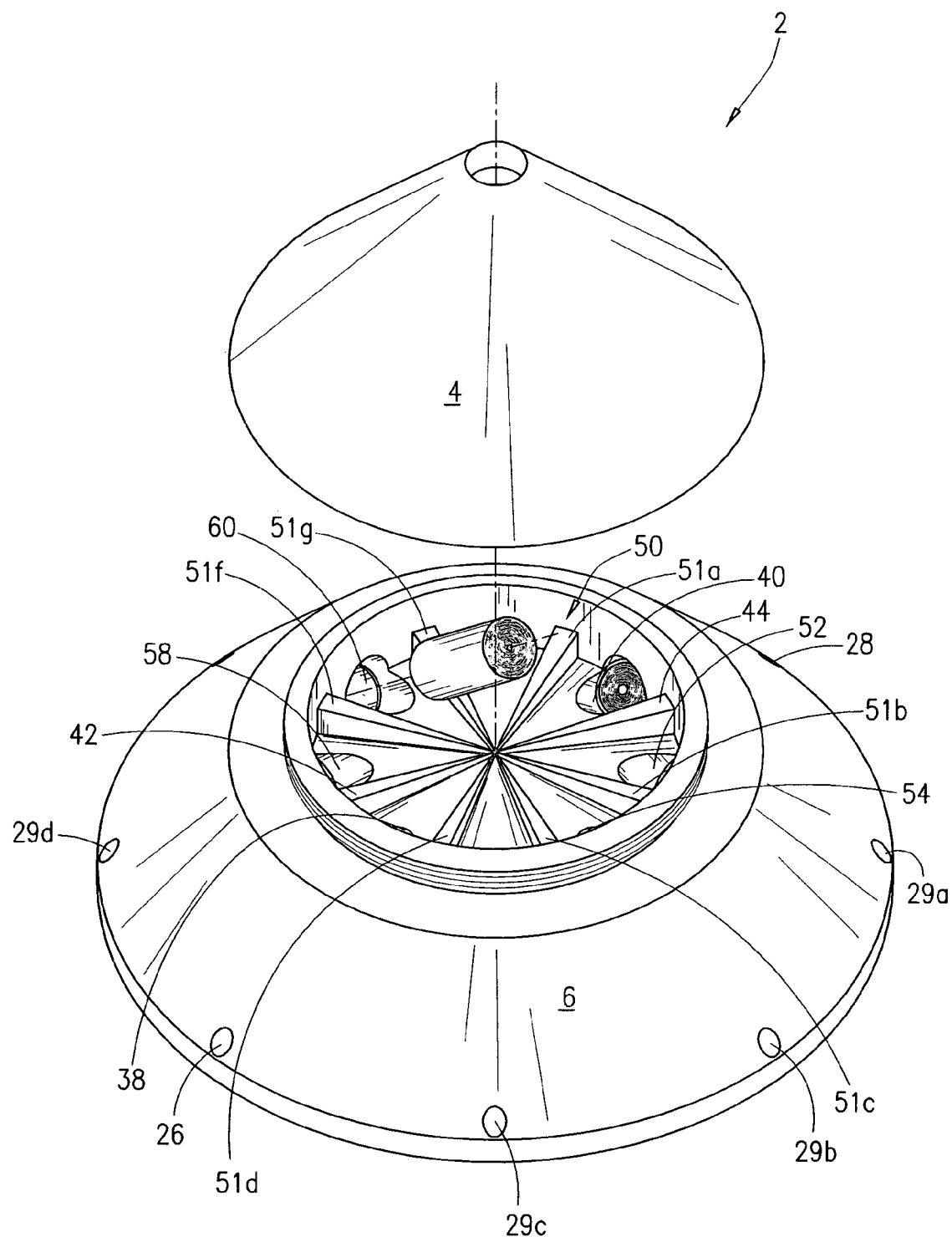
FIG. 2 is an isometric view of an exploded view of the rotor member seen in FIG. 1, which includes the rotor bowl and rotor cone.

Referring now to FIG. 2, an exploded isometric view of the rotor member 2 seen in FIG. 1 will now be described. The rotor member 2 includes the rotor bowl 4 and rotor cone 6. The impeller vane assembly 50 is shown in FIG. 2. The impeller vane assembly 50 consist of a plurality of impeller vanes. For instance, the impeller vane 42 and the impeller vane 44 from FIG. 1 are shown. The impeller vanes are rigid, with a vertically extending surface radially mounted on the top side of the rotor bowl 6 that directs the stream to the angled bores and more particularly to the membranes. FIG. 2 depicts a total of eight (8) vertically extending vanes, namely vanes 42, 44, 51a, 51c, 51d, 51f, 51g.

In the preferred embodiment shown in FIG. 2, there are eight (8) angled bores included within the rotor member, namely the bores 38, 40 (previously described) as well as the bores 52, 54, 56 (not shown in this view), 58, 60, 62 (not shown in this view). In the most preferred embodiment, each bore will have an impeller vane that aids in directing the stream from the baffle to the membranes. Thus, the baffle 14 directs the stream that has been energized with the centrifugal force to one of the impeller vanes, namely vanes 42, 44, 51a, 51b, 51c, 51d, 51f, 51g which in turn directs the energized stream to the bores 38, 40, 52, 54, 58, 60, 62. As mentioned earlier, the bores 38, 40, 52, 54, 58, 60, 62 will contain membranes that are used for separation and filtration purposes. FIG. 2 also depicts the permeate outlets 26, 28, as well as permeate outlets 29a, 29b, 29c, 29d.

Figure 3:
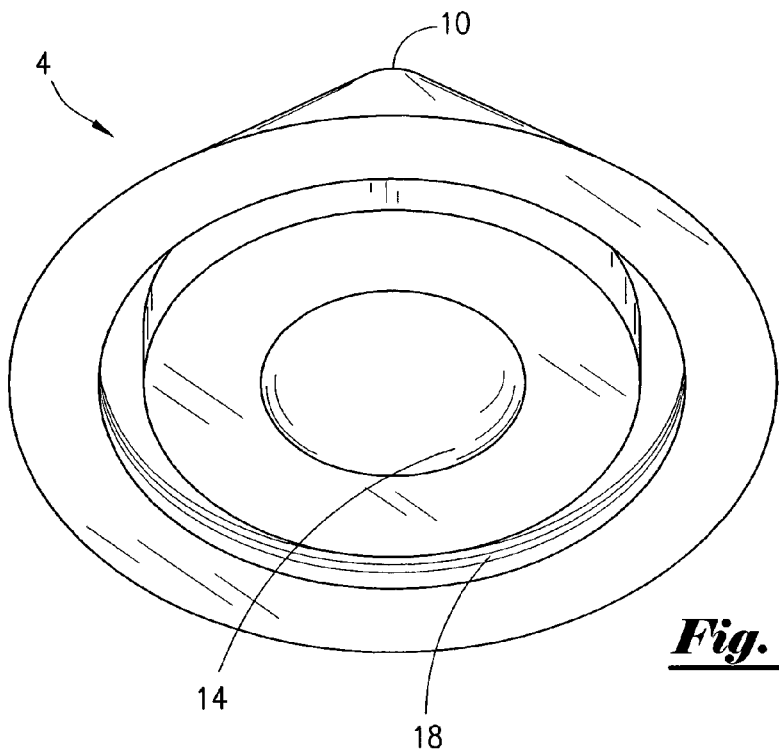
FIG. 3 is an isometric view of the rotor cone seen in FIG. 2.

In FIG. 3, an isometric view of the rotor cone 4 seen in FIG. 2 will now be described. This view depicts the underside portion of the rotor cone 4 so that the internal threads 18 are shown, along with the baffle 14. In the most preferred embodiment, the baffle 14 extends about the periphery of the internal rotor cone 4 so that the stream that has been forced radially outward will come into contact with the baffle 14 and wherein the baffle 14 will then direct the stream to the impeller vane assembly 50 (not shown in this view).

Figure 4:
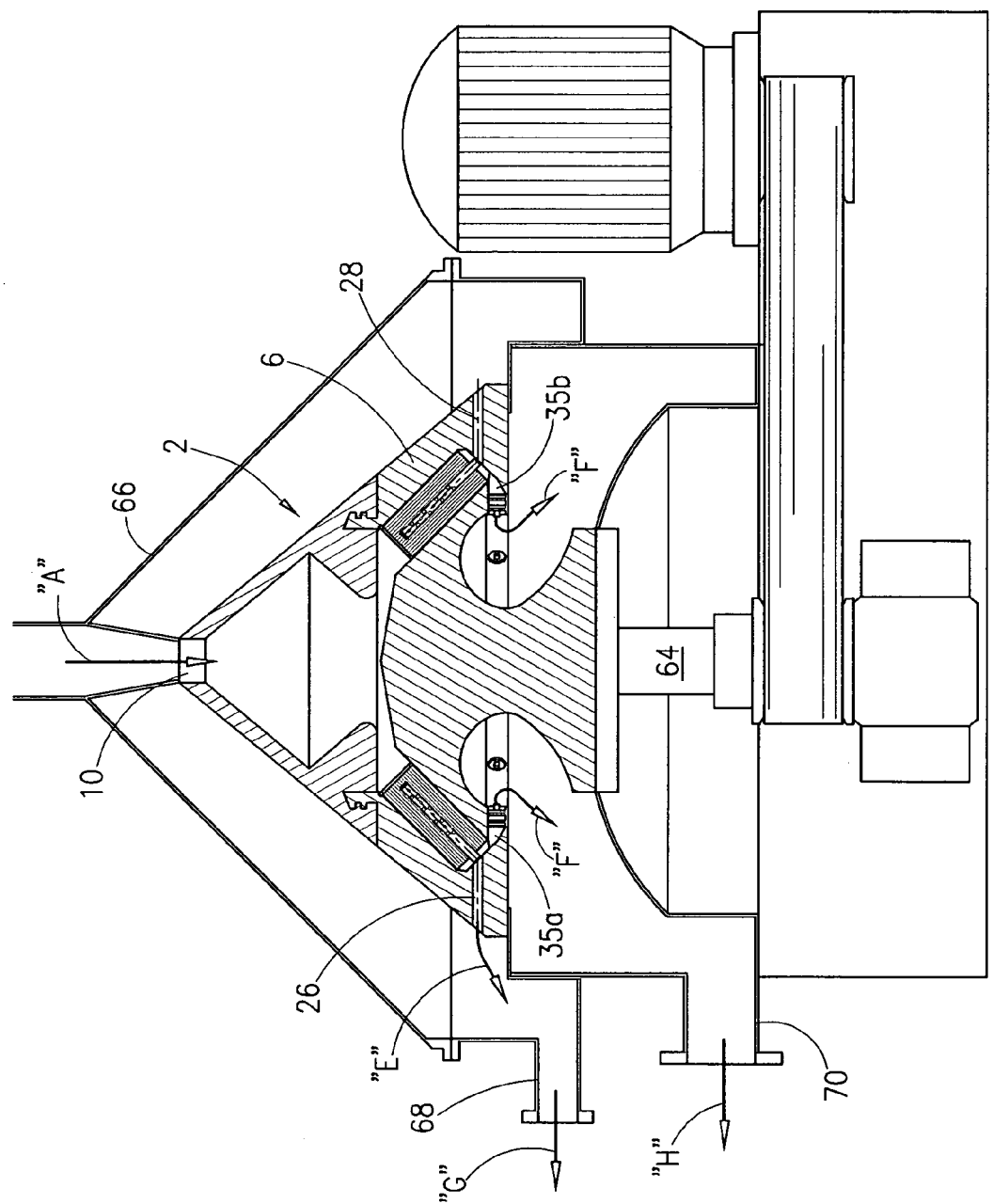
FIG. 4 is a partial cross-sectional view of the assembled apparatus of the present invention.

Referring now to FIG. 4, a partial cross-sectional view of the assemblied apparatus of the present invention will now be described. The rotor bowl 6 is fixedly attached to a drive means 64, such as an electric motor, for rotating the rotor bowl 6. The rotor member 2 is generally encased within an outer shell 66. The outer shell 66 includes an inlet passage 67 for the incoming stream. The outer shell 66 also includes a permeate outlet 68 that is operatively associated with all the permeate outlets (in this view showing outlets 26, 28), and wherein the first outlet 68 will direct the energized permeate from the outer shell 66 as shown by the arrow "G". The outer shell 66 further includes a retentate outlet 70 that is operatively associated with the retentate outlet channels (in this view showing outlet channels 35a, 35b), and wherein the second outlet 70 will direct the energized retentate from the rotor member 2 as shown by arrow "H".

Figure 5:
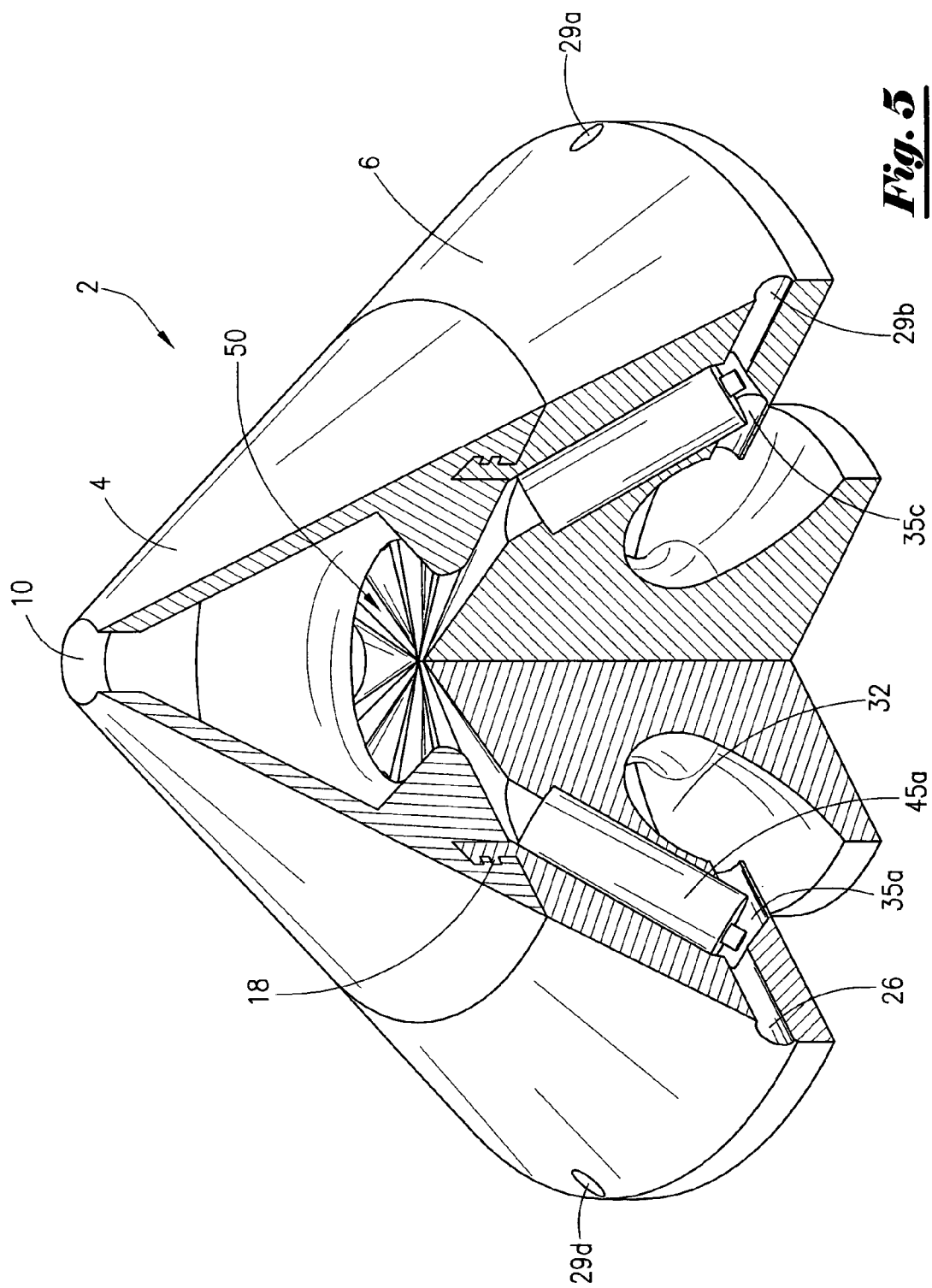
FIG. 5 is a partial cross-sectional view of the rotor member seen in FIG. 1.

In FIG. 5, which is a partial cross-sectional view of the rotor member 2, the cavity 32 is shown, and wherein the cavity 32 is shown as an inner circular cavity, wherein the retentate channels, for instance retentate channel 35a and retentate channel 35c, is directed radially inward to the cavity 32. The impeller vane assembly 50 is also shown as well as the permeate outlets 29a, 26, 29b, 29a.

Figure 6:
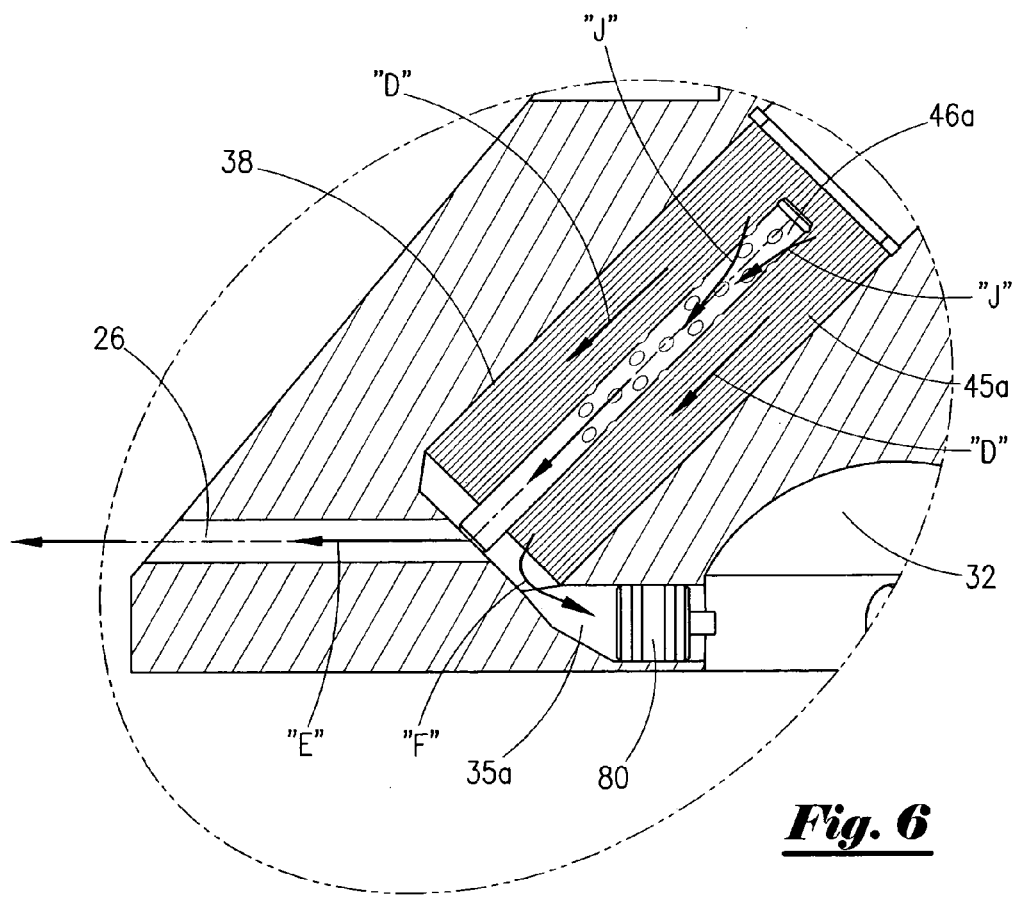
FIG. 6 is an exploded partial cross-sectional view of the membrane within a cavity.

FIG. 6 is an exploded partial cross-sectional view of the membrane 45a taken from FIG. 1. Hence, as the stream is channeled via the impeller vanes 51a, 44, 51b, 51c, 51d, 42, 51f, 51g, the stream (which is under pressure due to the centrifugal force, and is referred to as the energized stream) will enter into the membrane 45a. The membrane 45a may be a spiral wound membrane member that is commercially available from The Dow Chemical Company under the name FILMTEC Membranes. Membranes for reverse osmosis come in a variety of membrane materials but two important kinds are the thin-film composite membranes and the cellulose acetate membranes. It should be noted, however, that with respect to the invention herein disclosed, the specific composition of the membrane does not matter. In the preferred embodiment, the membrane will be configured in the spiral would cartridge design with a perforated permeate tube 46a, outer housing and flow pattern as shown in FIG. 6.

FIG. 6 also depicts the back pressure valve 80 that is placed into the retentate channel 35a in order to regulate pressure within the membrane 45a and the outlet 26 which in turn prevents back flow back through the membrane 45a to the impeller vanes. The back pressure valve 80 is commercially available from Circle Seal Controls Inc. under the name 5100 Series Valve. As understood by those of ordinary skill in the art, the stream will interact with the membrane and wherein the filtered fluid (referred to as the permeate) will be directed to the center tube 46a (see arrows "J"). From the center tube 46a, the permeate will be directed to the permeate outlet 26 (see arrow "E"). The unfiltered fluid (referred to as the retentate) will be directed through the membrane 45a (see arrows "D") and then to the retentate channel 35a (see arrow "F") which in turn is directed to the cavity 32. Note that the center tube 46a is perforated and aligned with the permeate outlet 26, while the remainder of the cross-sectional area of the membrane 45a will be in communication with the retentate channel 35a. Hence, the stream "D" at the end of membrane 45a will enter the retentate channel 35a.

Although the present invention has been described in terms of specific embodiments, it is anticipated that alterations and modifications thereof will no doubt become apparent to those skilled in the art. It is therefore intended that the following claims be interpreted as covering all such alterations and modifications as fall within the true spirit and scope of the invention.

I claim:

1. An apparatus for separating impurities from a stream comprising:
    a rotor cone cap having an inner conical wall and an outer portion, said rotor cone cap comprising:
    an inlet for the stream;
    a baffle plate extending about the periphery of said inner conical wall to distribute the stream radially inward;
    a rotor bowl having an inner portion and an outer portion, said rotor bowl being connected to said rotor cone cap, and wherein said rotor bowl comprises:
        a plurality of impeller vanes arranged on the inner portion of said rotor bowl, wherein said baffle plate directs the stream to said impeller vanes, and wherein said impeller vanes comprise a plurality of vertically extending members;
        an array of cavities operatively arranged to receive the stream from said plurality of impeller vanes;
        a membrane, operatively positioned within said array of cavities, for separating the impurities from the stream;
        a permeate outlet for delivering a permeate from the rotor bowl;
    drive means, operatively connected to said rotor bowl, for rotating the rotor bowl so that the stream within said inner conical wall and the stream within said inner portion of said rotor bowl is exposed to a centrifugal force.

2. The apparatus of claim 1 wherein said membrane comprises:
    a spiral wound membrane cartridge adapted to fit within said cavities.

3. The apparatus of claim 2 wherein said rotor bowl contains a retentate outlet for delivering the retentate from the rotor bowl.

4. The apparatus of claim 3 wherein the array of cavities is orientated at a angle between 10 degrees and 60 degrees relative to a horizontal axis of the rotor cone.

5. The apparatus of claim 4 wherein said retentate outlet contains a back pressure valve for regulating the pressure within the retentate outlet.

6. The apparatus of claim 5 wherein said permeate outlet is directed to the outer portion of said rotor bowl so that the permeate is directed radially outward.

7. The apparatus of claim 6 wherein the retentate outlet is directed to an inner chamber located radially inward from said array of cavities so that the retentate is directed radially inward.

8. The apparatus of claim 7 wherein said spiral wound membrane cartridge comprises: a thin film composite material.

9. A filtration apparatus for filtering a stream comprising:
a rotor member having an inner conical wall and an outer portion, said rotor member comprising:
   an inlet for the stream;
   a baffle plate extending about the periphery of said inner conical wall to distribute the stream radially inward;
   a plurality of impeller vanes arranged to receive the stream from said baffle plate, and wherein said plurality of impeller vanes comprise vertically extending member;
   an array of cavities operatively arranged to receive the stream from said impeller said array of cavities being arranged at a angle of between 60 degrees and 10 degrees relative to a horizontal axis of the rotor member;
   means, operatively positioned within said array of cavities, for separating the impurities from the stream;
   a permeate outlet for delivering a permeate from the rotor member;
drive means, operatively connected to said rotor member, for rotating the rotor member so that the stream within said inner conical wall and the stream received by said vertically extending members are exposed to a centrifugal force.

10. The apparatus of claim 9 wherein said separating means comprises:
   a spiral wound membrane cartridge adapted to fit within said cavities.

11. The apparatus of claim 10 wherein said rotor member contains a retentate outlet for delivering the retentate from the rotor member.

12. The apparatus of claim 11 wherein said retentate outlet contains a back pressure choke for regulating the pressure within said retentate outlet.

13. The apparatus of claim 12 wherein said permeate outlet is directed to the outer portion of said rotor bowl so that the permeate is directed radially outward.

14. The apparatus of claim 13 wherein the retentate outlet is directed to an inner chamber located radially inward from said array of cavities so that the retentate is directed radially inward.

15. The apparatus of 10 wherein said spiral wound membrane cartridge comprises: a cellulose acetate membrane.

16. The apparatus of claim 11 wherein the array of cavities is orientated at a angle between 50 degrees and 30 degrees relative to the horizontal axis of the rotor member.

17. A method of separating an affluent comprising:
   providing a rotor apparatus, said rotor apparatus comprising a rotor member having an inner conical wall and an outer portion, said rotor member including an inlet for the stream; an array of cavities operatively arranged on the outer periphery of the rotor apparatus and adapted to receive the affluent; a membrane, positioned within said array of cavities, for separating the impurities from the affluent; a permeate outlet for delivering a permeate from the rotor apparatus; and, a retentate outlet for delivering a retentate from the rotor apparatus;
   flowing the affluent to the inlet of the rotor apparatus;
   rotating the rotor apparatus;
   creating a centrifugal force within the inner conical wall of the rotor apparatus so that the affluent is forced to the outer periphery of the inner conical wall;
   directing the affluent to a baffle plate extending about the periphery of said inner conical wall to distribute the affluent radially inward;
   channeling the affluent from the baffle plate to a plurality of radially mounted impeller vanes;
   directing the affluent to the array of membranes arranged on the outer periphery of the rotor apparatus;
   separating the affluent in the array of membranes into the permeate and the retentate;
   producing the permeate from the rotor apparatus via the permeate outlet;
   producing the retentate from the rotor apparatus via the retentate outlet.

18. The method of claim 17 wherein said permeate outlet is directed to the outer portion of said rotor apparatus and wherein the step of producing the permeate includes directing the permeate radially outward.

19. The method of claim 18 wherein the step of producing the retentate from the rotor apparatus includes directing the retentate to an inner chamber located radially inward from said array of membranes so that the retentate is directed radially inward.

20. The method of claim 19 wherein the producing the retentate from the rotor apparatus includes controlling the back pressure within the retentate outlet.

* * * * *